United States Patent
Khosla et al.

(10) Patent No.: US 12,277,154 B1
(45) Date of Patent: Apr. 15, 2025

(54) SYSTEMS AND METHODS FOR MACHINE LEARNING MODELS TO ASSESS AND EXTRACT DATA FROM USER INPUTS

(71) Applicant: CK12 Foundation, Menlo Park, CA (US)

(72) Inventors: Vinod Khosla, Portola Valley, CA (US); Neeru Khosla, Portola Valley, CA (US); Miral Shah, San Jose, CA (US); Reza Shahbazi, Hillsborough, CA (US)

(73) Assignee: CK12 Foundation, Menlo Park, CA (US)

( * ) Notice: Subject to any disclaimer, the term of this patent is extended or adjusted under 35 U.S.C. 154(b) by 0 days.

(21) Appl. No.: 18/827,005

(22) Filed: Sep. 6, 2024

Related U.S. Application Data

(60) Provisional application No. 63/581,419, filed on Sep. 8, 2023.

(51) Int. Cl.
*G06F 16/334* (2025.01)
*G06F 40/35* (2020.01)

(52) U.S. Cl.
CPC .......... *G06F 16/3344* (2019.01); *G06F 40/35* (2020.01)

(58) Field of Classification Search
CPC .............................. G06F 16/3344; G06F 40/35
See application file for complete search history.

(56) References Cited

U.S. PATENT DOCUMENTS

| | | |
|---|---|---|
| 11,898,865 B1 | 2/2024 | Bhavsar et al. |
| 11,966,702 B1 * | 4/2024 | Wilkinson .......... G06F 18/2415 |
| 2007/0136273 A1 * | 6/2007 | Rehberg ................ G06F 40/186 |
| | | 707/999.005 |
| 2018/0218268 A1 * | 8/2018 | Kozloski ................ G06N 3/008 |
| 2019/0197415 A1 * | 6/2019 | Bulut ...................... G06N 20/00 |
| 2019/0294694 A1 * | 9/2019 | Dash ....................... G06F 17/18 |
| 2021/0264520 A1 * | 8/2021 | Cummings ............ G06Q 40/12 |
| 2023/0185820 A1 * | 6/2023 | Benoit .................. G06F 16/258 |
| | | 707/756 |
| 2023/0244934 A1 | 8/2023 | Lazaridou et al. |

OTHER PUBLICATIONS

Abu-Salih et al. "A systematic literature review of knowledge graph construction and application in education." Heliyon. Feb. 1, 2024, 10(3): e25383, 23 pages.

(Continued)

*Primary Examiner* — Eric Yen
(74) *Attorney, Agent, or Firm* — COOLEY LLP

(57) ABSTRACT

In some embodiments a processor can receive inputs associated with a user and classify, based on a first machine learning model using at least one input rubric, each input from the inputs into an input type. The processor can define, based on the input type of each input, a first set of inputs associated with a first evaluation type and a second set of inputs associated with a second evaluation type. The processor can select a second machine learning model based on the first evaluation type and can extract, using the second machine learning model, from the first set of inputs a pattern associated with the user, evaluate a first state of the user based on the pattern and a second state of the user based on the second set of inputs, and generate an assessment of the user based on the first state and the second state.

20 Claims, 5 Drawing Sheets

(56) References Cited

OTHER PUBLICATIONS

Akhtar et al. "Detecting fake news and disinformation using artificial intelligence and machine learning to avoid supply chain disruptions." Annals of Operations Research. Aug. 2023;327(2):633-57.

Alhothali et al. "Predicting Student Outcomes in Online Courses Using Machine Learning Techniques: A review." Sustainability. May 19, 2022;14(10):6199, 23 pages.

Alruwais et al. "Evaluating Student Knowledge Assessment Using Machine Learning Techniques." Sustainability. 2023; 15(7):6229, 25 pages.

Author Unknown. "College Tools. Leveraging AI for Effective University Exam Preparation: A Report." [online blog]. Retrieved from the Internet on Aug. 15, 2024. URL: https://www.collegetools.io/blog/leveraging-ai-for-effective-university-exam-preparation:-a-report, 6 pages.

Ayouni et al. "A new ML-based approach to enhance student engagement in online environment." Plos one. Nov. 10, 2021;16(11):e0258788, 16 pages.

Benedetto, Luca "Tackling Misinformation with Machine Learning." SWForum.eu [online forum]. Retrieved from the Internet on Aug. 15, 2024. URL: https://swforum.eu/online-sw-forum/software-technology/6/tackling-misinformation-machine-learning. 25 pages.

Chance et al. "Using AI to Help Students Prepare for the SAT Creating college entrance exam prep materials can take a lot of time, but artificial intelligence tools make the process easier." Edutopia.org. Nov. 9, 2023. Retrieved from the Internet. URL: https://www.edutopia.org/article/using-ai-sat-prep-lessons/, 11 pages.

Choi et al. "Towards an Appropriate Query, Key, and Value Computation for Knowledge Tracing." L@S '20: Proceedings of the Seventh ACM Conference on Learning @ Scale, Aug. 12-14, 2020, Virtual Event, USA, arXiv:2002.07033v5, URL: https://arxiv.org/pdf/2002.07033v5, 9 pages.

Christopher, James "How to Raise Your Test Scores with Help of AI Simulations." [online blog]. Retrieved from the Internet on Aug. 15, 2024. URL: https://jameschris.medium.com/how-to-raise-your-test-scores-with-help-of-ai-simulation-8ef210e9a46f, 12 pages.

Cooper, Colin "How AI and Machine Learning are Revolutionising Customer Engagement." [online blog] Jun. 27, 2023. Retrieved from the Internet. URL: https://medium.com/@colin-cooper/how-ai-and-machine-learning-are-revolutionising-customer-engagement-6552ea6ad146, 10 pages.

Co-pending U.S. Appl. No. 18/740,464, inventors Khosla; Neeru et al., filed Jun. 11, 2024.

Co-pending U.S. Appl. No. 18/887,313, inventors Khosla; Neeru et al., filed Sep. 17, 2024.

Ettorre et al. "A Knowledge Graph Enhanced Learner Model to Predict Outcomes to Questions in the Medical Field." HAL Open Science, EKAW 2020—22nd International Conference on Knowledge Engineering and Knowledge Management, Sep. 2020, Bolzano, Italy, https://inria.hal.science/hal-02915414, 16 pages.

Gimpel et al. "Unlocking the power of generative AI models and systems such as GPT-4 and ChatGPT for higher education: A guide for students and lecturers." Hohenheim Discussion Papers in Business, Economics and Social Sciences No. 02-2023; 2023, 57 pages.

Kannan et al. "Graph Neural Networks for Predicting Student Performance: A Deep Learning Approach for Academic Success Forecasting." International Journal of Intelligent Systems and Applications in Engineering (IJISAE). 2024, 12(1s), pp. 228-232.

Kong et al. "Validating a Computational Thinking Concepts Test for Primary Education Using Item Response Theory: An Analysis of Students' Responses." Computers & Education. Oct. 1, 2022;187:104562, 18 pages.

Kumar et al. "Identification and Addressal of Knowledge Gaps in Students." In 2022 3rd International Conference for Emerging Technology (INCET) May 27, 2022, 6 pages.

Liu et al. "Improving Knowledge Tracing via Pre-training Question Embeddings," arXiv:2012.05031v1, URL: https://arxiv.org/pdf/2012.05031, Dec. 9, 2020, 7 pages.

Matthews, Ed. "How Can AI Tools Improve Student Assessment Outcomes?" Open Assessment Technologies, TAO. 2023. [online]. Retrieved from the Internet. URL: https://www.taotesting.com/blog/how-can-ai-tools-improve-student-assessment-outcomes/, 9 pages.

Persaud, "Bloom's Taxonomy: The Ultimate Guide [Free Download], Gain a deep understanding of Bloom's taxonomy and how it can be effectively applied in the learning process to benefit both educators and learners." Top Hat Blog. May 15, 2024, retrieved on Jun. 21, 2024 at https://tophat.com/blog/blooms-taxonomy/, 11 pages.

Ruiz, Armand "AI for Personalized Learning System for Students." [online blog]. Jun. 3, 2023. Retrieved from the Internet. URL: https://www.nocode.ai/personalized-learning-system-for-students/, 10 pages.

Ruiz-Rojas et al. "Empowering Education with Generative Artificial Intelligence Tools: Approach with an Instructional Design Matrix." Sustainability. Jul. 25, 2023;15(15):11524, 20 pages.

Schmucker et al. "Assessing the Performance of Online Students—New Data, New Approaches, Improved Accuracy." arXiv preprint arXiv: 2109.01753. Sep. 4, 2021, 44 pages.

Sekeroglu et al. "Systematic Literature Review on Machine Learning and Student Performance Prediction: Critical Gaps and Possible Remedies." Applied Sciences. Nov. 18, 2021;11(22):10907, 23 pages.

Toti et al. "Detection of Student Engagement in e-Learning Systems Based on Semantic Analysis and Machine Learning." In Advances on P2P, Parallel, Grid, Cloud and Internet Computing: Proceedings of the 15th International Conference on P2P, Parallel, Grid, Cloud and Internet Computing (3PGCIC-2020) 15 2021, 13 pages (pp. 211-223).

Wang, M. "Characteristics of Item Response Time for Standardized Achievement Assessments." [Doctoral dissertation] University of Iowa, 2017, 244 pages.

Wu et al. "SGKT: Session graph-based knowledge tracing for student performance prediction." Expert Systems with Applications. Nov. 15, 2022; 206:117681, 12 pages.

\* cited by examiner

SYSTEMS AND METHODS FOR MACHINE LEARNING MODELS TO ASSESS AND EXTRACT DATA FROM USER INPUTS

CROSS REFERENCE TO RELATED APPLICATIONS

This application claims priority to U.S. Patent Application No. 63/581,419, filed Sep. 8, 2023, entitled "Systems and Methods for Machine Learning Models to Assess and Extract Information from User Inputs", the entire contents of which is hereby incorporated by reference in its entirety.

BACKGROUND

The embodiments described herein relate to systems and methods for machine learning models (e.g., neural network based models, large language models, etc.) to assess and extract data from user inputs.

Machine learning models can be used conversationally to provide outputs based on an input from a user. However, some known machine learning models are unable to assess if the inputs indicate additional information about the user or changes in user behavior.

Inputs entered into machine learning models may include erroneous data. The erroneous data may indicate a user misconception or gaps in user knowledge. If the erroneous data is not identified, the consequences can compound if the erroneous data is related to a fundamental concept. This may be especially dangerous for students or children.

Accordingly, a need exists for a machine learning model(s) that can assess and extract data from user inputs to guide a user to a desirable result.

SUMMARY

In some embodiments, a non-transitory processor-readable medium stores code representing instructions to be executed by one or more processors. The instructions include code to cause the one or more processors to receive, a plurality of inputs associated with a behavior of a user. The instructions include code to cause the one or more processors to classify, based on a first machine learning model using at least one input rubric, each input from the plurality of inputs into an input type from a plurality of input types. The first machine learning model is configured to extract relevant classification data from the plurality of inputs. The instructions include code to cause the one or more processors to define, based on the input type of each input from the plurality of inputs, a first set of inputs associated with a first evaluation type and a second set of inputs associated with a second evaluation type, wherein the second evaluation type is associated with a lower computational cost than the first evaluation type. The instructions include code to cause the one or more processors to select a second machine learning model based on the first evaluation type, the second machine learning model trained based on analytical data associated with the user. The instructions include code to cause the one or more processors to extract, using the second machine learning model, from the first set of inputs a pattern associated with the user. The instructions include code to cause the one or more processors to evaluate a first state of the user based on the pattern and a second state of the user based on the second set of inputs. The instructions include code to cause the one or more processors to generate a grade of the user based on the first state and the second state.

In some embodiments, a method includes receiving a plurality of inputs associated with a behavior of a user. The method includes classifying, based on a first machine learning model, each input from the plurality of inputs into an input type from a plurality of input types. The method includes defining, based on the input type of each input from the plurality of inputs, a first set of inputs associated with a first evaluation type and a second set of inputs associated with a second evaluation type. The method includes selecting a second machine learning model based on the first evaluation type. The method includes extracting, using the second machine learning model, from the first set of inputs a pattern associated with the user. The method includes evaluating a first state of the user based on the pattern and a second state of the user based on the second set of inputs. The method includes determining, based on the first state and the second state, if the first state and the second state satisfy one or more rubric conditions. The method includes responsive to determining that the one or more rubric conditions is not satisfied, generating, using a third machine learning model, one or more outputs. The method includes receiving, at least one update input associated with the one or more outputs. The method includes updating at least one of the first state or the second state based on the at least one update input. The method includes, responsive to determining that the one or more rubric condition is satisfied, generating a grade of the user based on the first state and the second state.

In some embodiments, a method includes training a first machine learning model, based on a set of representations of misinformation. The method includes receiving a plurality of inputs associated with behavior of a user. The method includes filtering the plurality of inputs to remove duplicate inputs. The method includes clustering, using the first machine learning model, the plurality of inputs based on input type to define clustered inputs. The method includes extracting, from the clustered inputs using the first machine learning model, one or more identified misinformation. The method includes categorizing the one or more identified misinformation to one or more categories to define categorized misinformation. The method includes training the first machine learning model based on the categorized misinformation to update the set of representations of misinformation with current information. The method includes generating, using a second machine learning model based on the one or more categories, at least one output. The method includes sending, to a user device, the at least one output.

DETAILED DESCRIPTION

Figure 1:
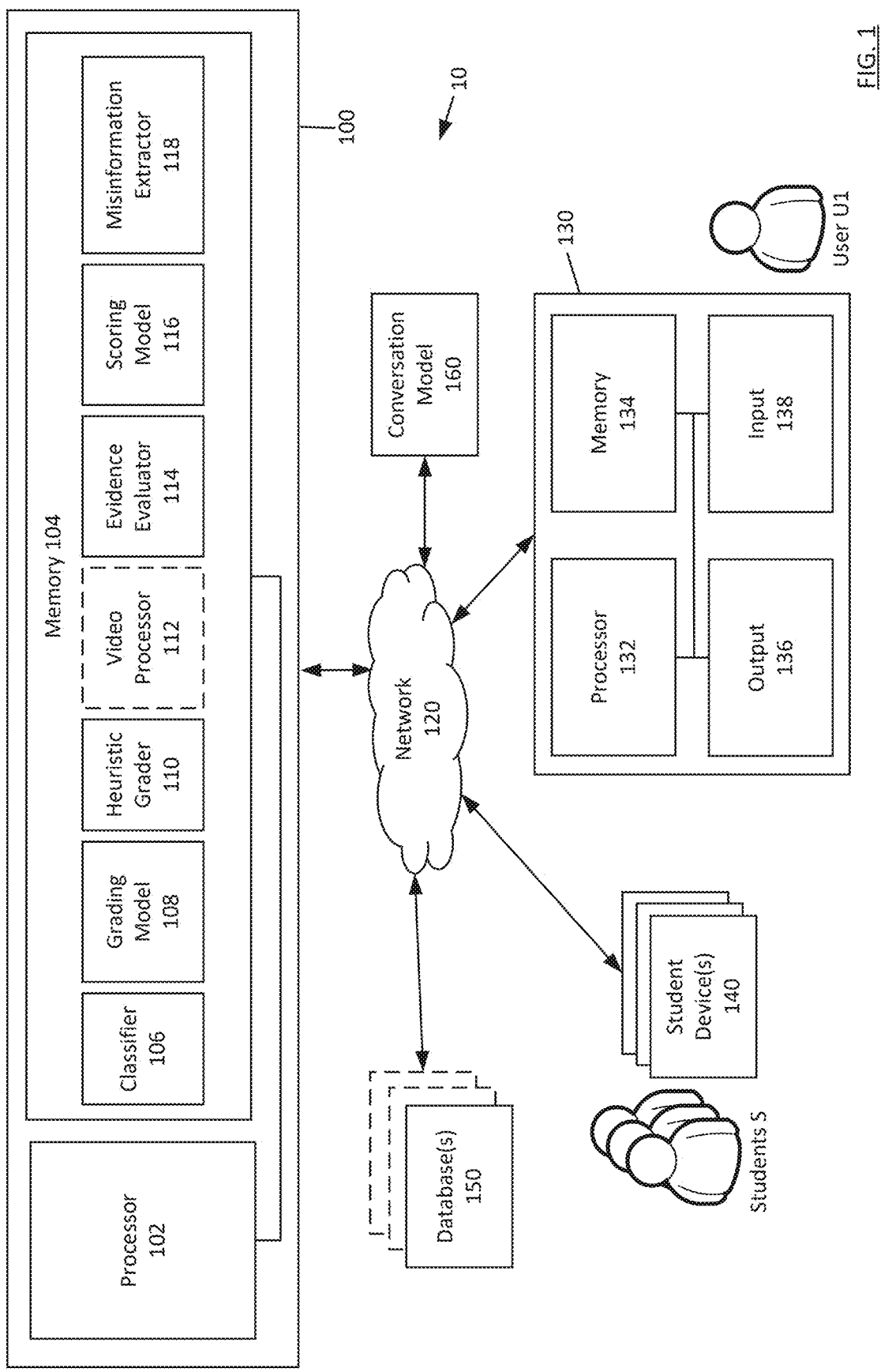
FIG. 1 shows a block diagram of a system for assessing and extracting information from user inputs, according to an example embodiment.

In some embodiments, a machine learning model is used to generate an assessment (e.g., a knowledge grade) of a user. A method includes, receiving a plurality of inputs associated with the behavior of the user. Each input is classified, based on at least one input rubric, into a plurality of input types. Each input is then defined, based on the input type, to a first set of inputs associated with a first evaluation type and a second set of inputs associated with a second evaluation type. A first state (e.g., a first knowledge state) is then evaluated based on the first set of inputs and a second state (e.g., a second knowledge state) is evaluated based on the second set of inputs. An assessment (e.g., a knowledge grade) is then generated based on the first state and the second state.

In some embodiments, a method includes receiving a plurality of inputs associated with the behavior of a user. A state (e.g., a knowledge state) is then evaluated based on the plurality of inputs. Based on an analysis of the state, missing performance evidence is then determined. The method includes generating user prompts associated with the missing performance evidence and receiving, based on displaying the user prompts to the user, additional inputs associated with the missing performance evidence. An updated state (e.g., an updated knowledge state) is then evaluated based on the plurality of inputs and the additional inputs. An assessment (e.g., knowledge grade) of the user is then generated based on the updated state.

Learning can be achieved using various mediums, including reading books, watching videos, listening to audio, and so forth. Traditionally, to determine how much a student knows about a particular topic, students are given various forms of tests and exams. These exams can include multiple choice questions, essay responses, fill-in-the-blank questions, and so on. These tests are often administered at the end of the student's time studying a particular subject, such as at the end of a unit, the end of a semester, or the end of a school year.

As discussed herein, with artificial intelligence-based conversational models, students may ask a conversational model for answers. However, the systems and methods described herein are configured to use user inputs with a conversational model to determine an assessment (e.g., a knowledge grade) of a user. The knowledge grade can indicate how a user's knowledge state corresponds to a grading rubric. The user inputs can further be used to present the user with additional information and/or prompts that may be determined to increase the knowledge state of the user.

When learning new material, users may encounter misinformation that may lead to misconceptions or gaps in knowledge. To decrease the likelihood that the misinformation has further consequences, the systems and methods described herein can be configured to extract learned misinformation from the user inputs and provide the user with prompts to unlearn the misinformation.

While some systems and methods described herein are described in reference to students and education, the system and methods can be applied to any set of user inputs to determine a state of a user. For example, the systems and methods described herein can be applied to employees and workplaces, a company and a market, and/or the like.

FIG. 1 shows a block diagram of a system 10 for processing data to assess and extract information from user inputs, according to an embodiment. The system 10 includes an evaluation system 100, a network 120, a user device 130 (e.g., primary compute device, hub, superior device, first compute device), student devices 140 (e.g., secondary compute device(s), node(s), etc.), database(s) 150, and a conversation model 160. In some embodiments, the system 10 is associated with an entity (e.g., commercial entity, educational entity, etc.), including and/or associated with user U1 and/or students S.

The network 120 facilitates communication between the components of the system 10. The network 120 can be any suitable communication network for transferring data, operating over public and/or private networks. For example, the network 120 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 120 can be a wireless network such as, for example, a Wi-Fi or wireless local area network ("WLAN"), a wireless wide area network ("WWAN"), and/or a cellular network. In some instances, the network 120 can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via the network 120 can be encrypted or unencrypted. In some instances, the network 120 can include multiple networks or subnetworks operatively coupled to one another by, for example, network bridges, routers, switches, gateways and/or the like (not shown).

The user device 130 is configured to generate, view, and/or complete actions by a user U1. The user device 130 includes a processor 132, a memory 134, an output 136, and an input 138, each operatively coupled to one another (e.g., via a system bus) and each in communication with the network 120. In some implementations, the user device 130 is associated with (e.g., owned by, accessible by, operated by, etc.) the user U1. The user U1 can be any type of user, such as, for example, a teacher, a professor, a school, an administrator, a manager, an employee, a customer, an operator, and/or the like. While the system 10 is shown in FIG. 1 as including one user device 130, in some embodiments the system 10 includes multiple user devices, each associated with one or more users and each in communication with the evaluation system 100 via the network 120.

The processor 132 of the user device 130 may be a hardware-based integrated circuit (IC) or any other suitable processing device configured to run and/or execute a set of instructions or code. In some implementations, the processor 132 is a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 132 is operatively coupled to and in communication with the memory 134, the output 136, the input 138, and the network 120, such as through a system bus (e.g., address bus, data bus, control bus, etc.) and/or a wireless connection.

The memory 134 of the user device 130 may be a random-access memory (RAM), a memory buffer, a hard drive (e.g., solid state drive (SSD), hard disk drive (HDD), etc.), a read-only memory (ROM), an erasable programmable read-only memory (EPROM), and/or the like. In some instances, the memory 134 can store, for example, one or more software programs and/or code that can include instructions to cause the processor 132 to perform one or more processes, functions, and/or the like. In some implementations, the memory 134 includes extendable storage units that can be added and used incrementally. In some implementations, the memory 134 can be a portable memory (e.g., a flash drive, a portable hard disk, and/or the like) that can be operatively coupled to the processor 132. In some embodiments, the memory 134 can be remotely operatively coupled with a compute device separate from (e.g., detached from) the user device 130. For example, a remote database device can serve as a memory and be operatively coupled to the user device 130.

The output 136 is operatively coupled to the processor 132 and is configured to present (e.g., display, provide, etc.) information to user U1. For example, in response to the evaluation system 100 generating a future student skill prediction, processor 132 can receive the future student skill prediction and the output 136 can present the future student skill prediction to the user U1. In some implementations, the output 136 is a display, such as a Cathode Ray tube (CRT) display, Liquid Crystal Display (LCD), Light Emitting Diode (LED) display, Organic Light Emitting Diode (OLED) display, and/or other displays configured to present information visually. In some implementations, the output 136 is a speaker or other audio output device configured to present information to the user U1, such as the future student skill prediction, aurally. In some implementations, the output 136 is configured to provide feedback to the user U1 via haptic feedback.

The input 138 is operably coupled to the processor 132 and is configured to provide a signal to the processor 132 to complete a task. In some implementations, the input 138 is a peripheral device, such as a mouse, keyboard, global positioning system (GPS), microphone, touch screen, speaker, scanner, headset, camera, and/or the like. In some instances, the user U1 can use the input 138 to send information to the evaluation system 100 via the network 120, such as a knowledge graph or a location of the user device 130. In some instances, the input 138 is configured to provide a request for information (e.g., query) to the evaluation system 100 via the network, such as a request for a knowledge grade of a student S.

In some implementations, each of the student devices 140 can be substantially similar to the user device 130. The student devices 140 can include a processor similar to the processor 132, a memory similar to the memory 134, an output device similar to the output 136, and an input device similar to the input 138. The student devices 140 are configured to send and receive information from the evaluation system 100 via the network 120. The information provided to the evaluation system 100 by the student devices 140 may include device data (e.g., battery health, network connectivity speed, geographic location, etc.), student engagement data (e.g., screentime, keylogger information, login and logout times, shutdown and start up times, etc.), and other raw data input to the student devices 140.

The databases 150 store information related to the system 10 and the processes described herein. For example, the databases 150 can store organizational strategy information, change logs, change triggers, digital calendars, communications, activity reports, direct engagement information, digital artifacts (e.g., email messages, calendar appointments, documents, text messages, reports, etc.), conversation data, assessment data, assignment data, user and/or student profiles, data on content explored by users and/or students and/or similar information. The databases 150 can be any device or service configured to store signals, information, and/or data (e.g., hard-drive, server, cloud storage service, etc.). The databases 150 can receive and store signals, information and/or data from the other components (e.g., the user device 130, the student device(s) 140, the conversation model 160, the evaluation system 100, etc.) of the system 10. The databases 150 can include a local storage system associated with the evaluation system 100, such as a server, a hard-drive, or the like or a cloud-based storage system. In some implementations, the databases 150 can include a combination of local storage systems and cloud-based storage systems. In some implementations, the databases 150 include different databases for storing different information. For example, the databases 150 can include a database for storing information used to determine a knowledge grade for a student and a database for storing information used to extract misinformation from student inputs. In some implementations, the databases can include information associated with multiple entities and/or the user U1.

The system 10 further includes a conversational artificial intelligence (AI) model, shown as a conversation model 160. The conversation model 160 can receive inputs from and provide outputs to one or more users or students S. The conversation model 160 can be used as a chatbot by the students S to aid in their learning of particular topics. The conversation model 160 can record and save chat information (e.g., from conversations with the student) in the databases 150. In some implementations, the conversation model 160 includes a large language model, and/or the like to generate outputs based on the inputs from the one or more users or students S.

In some implementations, the conversation model 160 can provide prompts to one or more users or students to obtain information (e.g., user information, student information, knowledge information) and can use the one or more inputs to update a knowledge graph, train a model (e.g., the classifier 106, the grading model 108, the misinformation extractor 118, etc.) or as input to a model (e.g., classifier 106, misinformation extractor 518, etc.). In some implementations, the conversation model 160 stores students'S inputs and associated outputs in the database(s) 150. The conversation model 160 can be configured to receive inputs form the evaluation system 100 and to display prompts to the students S based on the inputs.

The evaluation system 100 is configured to receive a plurality of inputs (e.g., from the conversation model 160, from the database(s) 150, from the student device(s) 140, from the user device 130, etc.) and to determine a knowledge grade and extract misinformation from the plurality of inputs. The evaluation system includes a processor 102 and a memory 104, each operatively coupled to one another (e.g., via a system bus). The memory 104 may include a classifier 106, a grading model 108, a heuristic grader 110, a video processor 112, a scoring model 116, and a misinformation extractor 118. In some implementations, the video processor 112 is optional. In some implementations, the user device 130 is associated with (e.g., owned by, accessible by, operated by, etc.) an organization, and the evaluation system 100 is associated with (e.g., owned by, accessible by, operated by, etc.) the same organization. In some implementations, the user device 130 is associated with (e.g., owned by, accessible by, operated by, etc.) a first organization, and the evaluation system 100 is associated with (e.g., owned by, accessible by, operated by, etc.) a second organization, different than a first organization. In some implementations, the evaluation system 100 and the user device 103 may be components of the same computing system.

The processor 102 of the evaluation system 100 can be, for example, a hardware based integrated circuit (IC), or any other suitable processing device configured to run and/or execute a set of instructions or code. For example, the processor 102 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor can be operatively coupled to the memory 104 through a system bus (e.g., address bus, data bus, and/or control bus).

The memory 104 of the of the evaluation system 100 can be, for example, a random-access memory (RAM), a memory buffer, a hard drive, a read-only memory (ROM), an erasable programmable read-only memory (EPROM), and/or the like. In some instances, the memory 104 can store, for example, one or more software programs and/or code that can include instructions to cause the processor 102 to perform one or more processes, functions, and/or the like. In some implementations, the memory 104 can include extendable storage units that can be added and used incrementally. In some implementations, the memory 104 can be a portable memory (e.g., a flash drive, a portable hard disk, and/or the like) that can be operatively coupled to the processor 102. In some instances, the memory 104 can be remotely operatively coupled with a compute device (not shown). For example, a remote database device can serve as a memory and be operatively coupled to the compute device.

The evaluation system 100 can receive inputs from the database(s) 150, the student device(s) 140, the user device 130, and/or the conversation model 160 and determine an assessment (e.g., a knowledge grade) based on the inputs. The inputs can be associated with the behavior and/or knowledge of the students S. In some implementations, the inputs can include student S questions and conversation model 160 answers. For example, the inputs can include a question a student S asked the conversation model 160 such as, "What is photosynthesis?", "solve $X^2-4=0$," and associated answers from the conversation model 160. In some implementations, the inputs can include prompts sent to the student device(s) by the conversation model 160 and associated student S answers. For example, the prompts can include questions for checking concept understanding including procedural questions in math and physics, conceptual questions in biology and chemistry, critical thinking questions in science and math, and/or the like. The student S answer can include full answers or can include information indicating that the conversation model 160 guided the student S through the answer. In some implementations, the inputs can include quiz submissions associated with the students S. The quiz submissions can include quiz substance, student S answers, if the conversation model 160 provided hints and/or learning material, the associated hints and/or learning material, and/or the like. In some implementations, the quiz submissions can include student S uploads of physical quizzes taken outside of the context of the system 10. In some implementations, the inputs can include learning interactions, which can include information regarding how much time the students S spend on a section, concept, question, etc., how the students S interact with the conversation model 160 (e.g., tone of the student's questions, such as student becoming frustrated, number of times a student poses a question, different ways a student asks a question, etc.), how the students S interact with learning content, how many times a student S changes their answer to a specific question, and/or the like. In some implementations, the inputs can include visual inputs (e.g., from a camera on the student device(s) 140, etc.), which can include a camera feed, images, and/or the like.

In some implementations, the evaluation system 100 is configured to extract misinformation and/or identify gaps in knowledge from the inputs. In some implementations, based on at least one of the extracted misinformation and the knowledge grade associated with a student S, the evaluation system 100 can be configured to send one or more outputs to the conversation model 160 and/or the student device(s) 140 to provide additional information to increase the knowledge grade and/or correct the misinformation. In some implementations, the evaluation system 100 may be configured to send one or more output to the conversation model 160 and/or the student device(s) 140

The classifier 106 receives the inputs and classifies the inputs based on at least one rubric. In some implementations, the classifier 106 is a machine learning model (e.g., deep learning model, neural network, natural language processing (NLP) model, reinforcement learning model, etc.). The at least one rubric can include a plurality of taxonomies that are associated with input types. The classifier 106 receives the inputs and maps the inputs to an input type as dictated by the at least one rubric. In some implementations, the at least one rubric can include Bloom taxonomy, state or national standards, a taxonomy specific to a school or district, and/or the like. In some implementations, the input types can include procedural, conceptual, human-written response, multiple choice response, specific subject (e.g., math, physics, etc.), chemical equation balancing, mental health, unit conversion, and/or the like. In some implementations, the classifier 106 can classify inputs that are not relevant to the evaluation system 100 as being out of scope. In some implementations, the classifier 106 can include a transformer model (e.g., LLM model) trained to determine relevant portions of an input. In some implementations, the transformer model can be trained on curated content (e.g., curated by a subject matter expert). In some implementations, the output of the transformer can be modified, changed, and/or augmented by a large language model. In some implementations, the classifier 106 can use a large language model (LLM) for student S's written inputs to extract information relevant for classification. In some implementations, the classifier 106 can classify at least one of the inputs to more than one input type. In some implementations, the classifier 106 can classify the inputs based on evaluation type. For example, a first evaluation type can be associated with a type of input that may be evaluated by a machine learning algorithm (e.g., a complex input type) and a second evaluation type can be associated with a type of input that may be evaluated heuristically (e.g., a simple input type). For example, the first input type can include inputs such as student S conversations and/or student generated answers, and/or the like, and the second input type can include inputs such as student S answers to multiple-choice questions.

The grading model 108 is configured to receive the classified inputs. In some implementations, the classified inputs include a first set of inputs classified as being associated with the grading model 108. The grading model 108 determines a knowledge state (e.g., a first knowledge state) of at least one student S based on the classified inputs. The knowledge state indicates whether and/or how much the student S has demonstrated to understand one or more concepts. For example, if a student S answers a question correctly, the grading model 108 generates an indication that the student S understands a concept and if the student S answers a question incorrectly, the grading model 108 generates an indication that the student S does not fully understand the concept. For another example, if the student S asks a question in a certain way, the grading model 108 can generate an indication that the student S does not understand a concept and if the student S asks a different question in a different way, the grading model 108 can generate an indication that the student S understands the concept. The grading model 108 uses at least one machine learning model (e.g., NLP model, LLM model, etc.) to determine, based on the classified inputs, the knowledge state. The at least one machine learning model is trained to determine a knowledge state from complex inputs, such as student S's written answers, student S's conversations with conversation model 160 and/or the like. This allows for a variety of inputs, not just inputs to which a knowledge state is directly correlated, to be used by the evaluation system 100. In some implementations, the grading model 108 is trained based on learning analytics based on responses from the students S. In some implementations, training the at least one machine learning model can include tuning outputs and/or providing suitable examples to the at least one machine learning model. In some implementations, the at least one machine learning model is a pretrained model that is tuned (e.g., customized) based on an organization's preferences. Pretraining can include masked token prediction on data such as educational content (e.g., lesson corpus, etc.). Tuning can include using a smaller set of samples in the form of example user inputs evaluated by subject matter experts.

In some implementations, determining the knowledge state can include first extracting a pattern associated with the at least one student S and then evaluating the knowledge state based on the pattern. The pattern can be associated with user-generated answers and/or questions related to certain topics, concepts, question types, and/or the like. In some implementations, the pattern is extracted with the at last one machine learning model.

The heuristic grader 110 is configured to receive the classified inputs. In some implementations, the classified inputs include a second set of inputs classified as being associated with the heuristic grader 110. The heuristic grader 110 determines the knowledge state (e.g., a second knowledge state) of the at least one student S based on the classified inputs. The heuristic grader 110 determines the knowledge state of the classified inputs based on heuristics. For example, for an input that include a multiple-choice question, the input can be evaluated using heuristics to determine the knowledge state. Using the heuristic grader 110 on simpler inputs can reduce the computing resources used by the grading model 108, thus saving computing power, time, and/or cost. In some implementations, the knowledge state of an input can be determined by both the grading model 108 and the heuristic grader 110. In some implementations, the evaluation system 100 may include additional models to determine the knowledge state. In some implementations, the evaluation system 100 may define a composite knowledge state based on at least the first knowledge state and the second knowledge state. In some implementations, the heuristic grader 110 and the grading model 108 may be the same model. In some implementations, the heuristic grader 110 may include reinforcement learning.

The video processor 112 is configured to receive a visual signal (e.g., camera signal, etc.) associated with the user (e.g., student). The video processor 112 is configured to determine, based on the visual signal, a user engagement of an associated student S. In some implementations, the video processor 112 uses optical character recognition (OCR), computer vision, and/or the like. In some implementations, the video processor 112 uses a vision transformer model to determine the behavior of the user. The behavior can indicate if the user is engaged during a learning procedure (e.g., when engaging with the conversation model 160, taking a quiz, reviewing study materials, etc.). For example, the video processor 112 can determine if a user is getting frustrated with a certain concept or if a certain style of learning (e.g., videos, text, etc.) is more effective at keeping the user engaged. In some implementations, the video processor can use video analytics and/or facial analysis to identify facial and/or body expressions. Such expressions can include a timestamp so that the time of an expression can be correlated to what was being presented to the user at that time. In such a manner, the video processor 112 can identify a user's reaction to content being presented to the user. In some implementations, the video processor 112 is optional.

In some implementations, the video processor 112 may be configured to receive images of physical learning materials (e.g., quizzes, worksheets, homework, etc.). The video processor 112 is configured to receive the images and convert the images to text that may be used as an input by the evaluation system 100 (e.g., as an input to the classifier 106).

The evidence evaluator 114 is configured to receive the knowledge state(s) as determined by the grading model 208 and the heuristic grader 210. The evidence evaluator 114 determines if there is a sufficient amount of data to determine a knowledge grade for each student S based on one or more rubrics. In some implementations, a sufficient amount of data may be a total amount of data on a specific concept, topic or subject exceeding a predetermined threshold. In some implementations, determining whether a sufficient amount of data on a concept for a student S can be identified to sufficiently evaluate the student can be based on heuristic rules.

The evidence evaluator 114 may determine that a student S has not interacted with enough learning content associated with one or more concepts as indicated in the one or more rubrics. The evidence evaluator 114 may then generate new learning materials so that more information regarding the student S's familiarity with the one or more concepts can be collected and processed. Generating new learning materials can, in some implementations, include pulling learning materials from the database(s) 150 that includes learning materials associated with and/or designed to evaluate the student S's knowledge of the one or more concepts. In some implementations, the evidence evaluator 114 may generate additional learning materials. In some implementations, the evidence evaluator 114 may use a machine learning model (e.g., an LLM, a reinforcement learning model, etc.) to generate the additional learning materials. In some implementations, the generated additional learning materials can include user prompts. In some implementations, the generated user materials can include a series of questions that progressively increase in difficulty for the student S. In some implementations, the additional learning materials can be tailored (e.g., rephrased, reduced, etc.) towards the determined knowledge state of the student S. In some implementations, the evidence evaluator 114 can use reinforcement learning to generate additional learning materials. The additional learning materials may then be outputted so that they may be displayed to the student S via the student devices 240 and/or the conversation model 160. The evaluation system 100 then processes the resulting inputs from the student S to update the knowledge states.

In some implementations, a determination on whether a sufficient amount of data on a concept for a student S has been received and obtaining additional information from that student S can be based on a reinforcement learning model. In such implementations, the reinforcement learning model can be activated based on a determination that there is insufficient evidence (e.g., amount of data is below a predetermined threshold) for a specific concept. The reinforcement learning model can be configured to determine how to increase evidence gained (e.g., maximize evidence, optimize evidence, etc.) based on a plurality of evidence increasing actions (e.g., generated learning content, predetermined learning content, etc.) such as questions, action types (e.g., conversation model, notifications, emails, texts, etc.), personalization (e.g., location, preferences, hobbies, interests, goals, etc.) and/or the like. The reinforcement learning model can be configured to select one or more of the evidence increasing actions based on which of the actions is likely to increase student engagement the most. For example, the reinforcement learning model can be configured to determine a question (e.g., data) and how the question will be sent (e.g., transmission type, email, notification, conversation model, etc.). More specifically, a node in the reinforcement learning model's environment can represent a state of the student (e.g., an agent of the reinforcement learning model). The reinforcement learning model can then work to maximize a reward (e.g., student S engagement and evidence gained on a student S's understanding of a concept) as the student traverses nodes the environment. Similarly stated, the reinforcement learning model can be configured to obtain sufficient evidence on the concept with the least number of actions and the highest amount of student S engagement. Next actions for the student S in the reinforcement learning model can be selected based on which next action is most likely increase student S's engagement and the amount of evidence the evidence evaluator 114 has for the student on a concept. This can be based on data (e.g., question presented, information presented, interactions, etc.) and how the data is presented (e.g., transmission type, email, notification, conversation model, etc.). Based on the response to that action, the next subsequent action can be taken to maximize the reward (e.g., engagement and evidence gained) for that student S. Such a reward and the data to train the reinforcement learning model can be specific to the student S and/or generalized based on characteristics of the student S. As such, the decisions made by the reinforcement learning model can be tailored to that particular student S.

During execution of the reinforcement learning model, hyperparameters can be tuned such that a balance is maintained between exploration and exploitation. Specifically, as an agent (e.g., the student S) traverses the reinforcement learning model, the next step and/or action (e.g., node) can be selected not necessarily based on what appears to be the best next action. Instead, based on a weighting factor, the agent may explore actions other than the likely best action a percentage of the time. The reinforcement learning model can then be further trained based on a result of this exploration. In this manner, the reinforcement learning model can be updated and refined based on exploration and testing different actions.

In some implementations, the evidence evaluator 114 may use outputs from the video processor 212 to determine if there is sufficient data to determine the knowledge grade. For example, if a user appears to be confused about a concept based on the output from the video processor 212, the evidence evaluator 114 may generate additional learning materials associated with that concept. The evidence evaluator 114 can also determine that there is sufficient data to determine a knowledge grade for the student S. In some implementations, if the evidence evaluator 114 determines that there is sufficient data as identified in the one or more rubric, the evidence evaluator 114 does not generate additional learning materials.

The scoring model 116 generates a knowledge grade based on the knowledge states. Generating the knowledge grade may include comparing the knowledge states to one or more rubric and determining the knowledge grade from the one or more rubrics. The knowledge grade indicates to a user (e.g., a student S, teacher, parents, etc.) how proficient the student S is at an associated concept based on the one or more rubrics. The knowledge grade can be used to determine a lesson plan for the student S that is suitable for the student S. In such a manner, a knowledge grade can be generated for a student using information from various interactions with a student (e.g., using conversations with conversation model 160 in addition to tests and assignments). In such a manner, a knowledge grade can be more wholistic and/or more indicative of a student's knowledge on a topic.

The misinformation extractor 118 is configured to extract misinformation from the inputs. Misinformation can include student S misunderstandings, gaps in student knowledge, incomplete information, incorrect information, inaccurate conceptions of concepts, misidentifying concepts, and/or the like. For example, misinformation can be mistaking similarities in nomenclature, such as, for example, mistaking stem and leaf in biology and stem and leaf in statistical plots. As another example, misinformation can include mistaking surface similarities in perception, such as, for example, mistaking the sun's heat and brightness for burning instead of nuclear fusion. As another example, misinformation can include pigeonholed concepts, such as, for example, thinking that electrons orbit the atomic nucleus the same way planets orbit the Sun. As another example, misinformation including gaps in knowledge can include identifying a missing prerequisite for understanding a concept.

The misinformation extractor 118 receives the inputs and processes the inputs. Processing can include clustering student S questions and answers to reduce redundancy in input data. Clustering can include clustering inputs based on question type, concept, and/or the like. In some implementations, the misinformation extractor 118 can use a transformer to cluster the inputs. Processing can include merging the clustered inputs with other inputs, such as student S quiz submission, offline quiz results, offline learning information, learning interactions (e.g., conversations with conversation model), and/or other similar inputs. The misinformation extractor 118 can extract misinformation form the inputs. In some implementations, misinformation is extracted using a machine learning model trained to extract information. The machine learning model may be trained using historical and/or common misinformation information. In some implementations, the outputs of the misinformation extractor 118 can be used to further train the machine learning model. In some implementations, the machine learning model includes a large language model (LLM), an NLP model, a reinforcement learning model, and/or the like. In some implementations, an NLP model can be used to extract misinformation (e.g., by recognizing and/or identifying natural language text) and a large language model can be used to process and distill the extracted misinformation, as described herein. Based on the extracted misinformation, the misinformation extractor 118 may be configured to send a signal to an associated student device 140 to indicate to a student S that their understanding may include potential misinformation. This allows the student S to unlearn, relearn, etc., the concept that included the misinformation. In some implementations, the misinformation extractor 118 can send learning materials associated with the misinformation to the associated student device 140. In such a manner, misinformation extractor 118 can obtain sufficient information to provide a knowledge grade to a student S.

In some implementations, the misinformation extractor 118 also distills the misinformation that has been extracted. Distilling the information can include categorizing the misinformation. The categorized misinformation may be stored in at least one database 150. In some implementations, the misinformation extractor 118 distills the misinformation into a report that can be sent to the user device 130 for review by the user U1. The user U1 may be a teacher, a parent, and/or the like. In some implementations, the report can be tailored to the type of user U1. For example, the report for a teacher may be different than a report for a parent. In some implementations, the report can be stored in the at least one database 150. In some implementations, the misinformation extractor 118 includes a second machine learning model to distill the misinformation. In some implementations, the second machine learning model is a large language model, an NLP model, and/or the like. In some implementations, the second machine learning model can be seeded with example categories to train the second machine learning model.

In some implementations, the misinformation extractor 118 can determine that no misinformation is present. The misinformation extractor 118 may generate a report or signal indicating that there is no misinformation present to the student S or the user U1.

Figure 2:
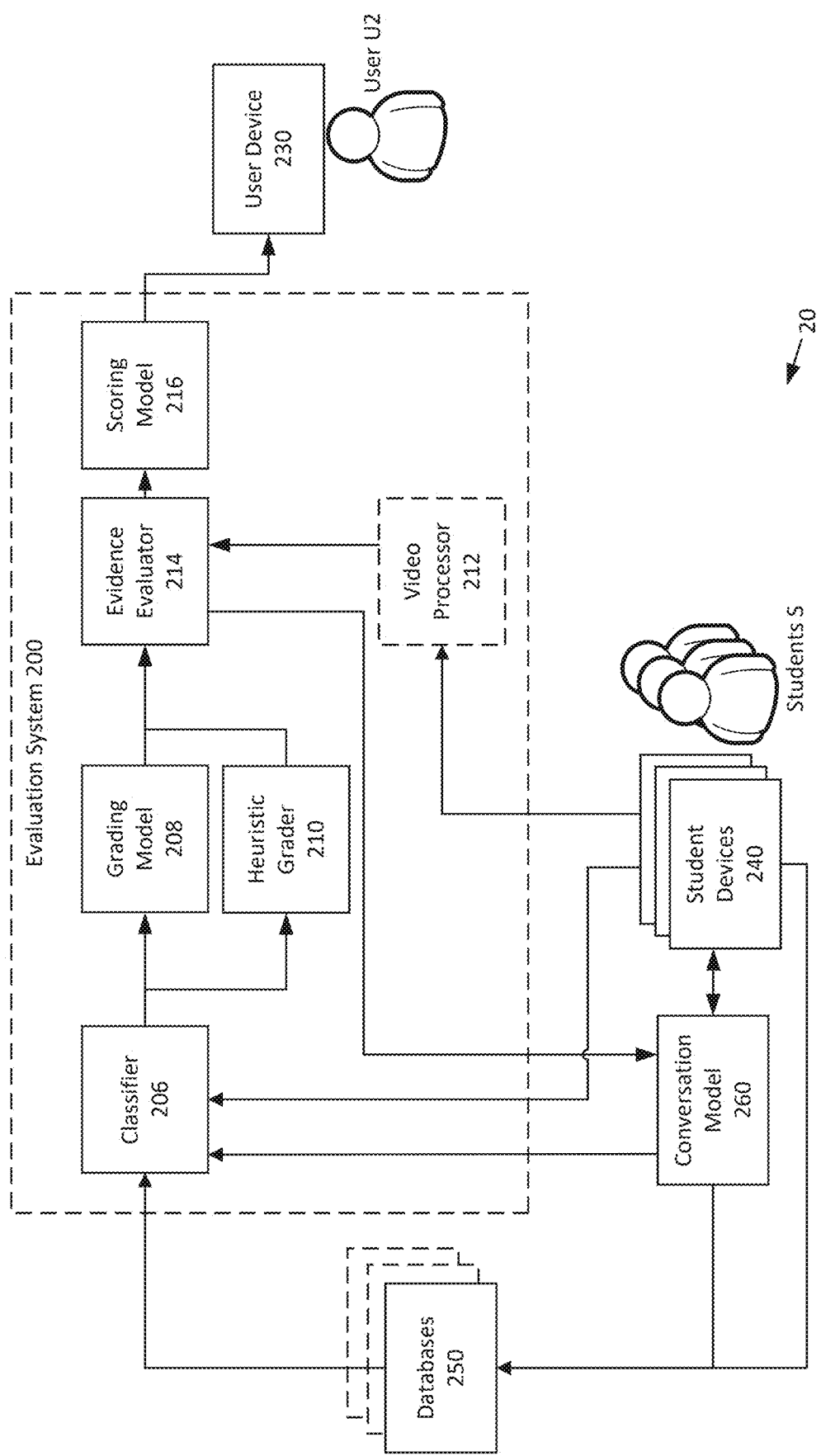
FIG. 2 shows a flowchart of a system for generating an assessment of a user, according to an example embodiment.

FIG. 2 shows a flowchart of a system 20 for generating a knowledge grade of a student, according to an example embodiment. In some implementations, the system 20 is structurally and/or functionally similar to the system 10 of FIG. 1. The system 20 includes an evaluation system 200 (e.g., structurally and/or functionally similar to the evaluation system 100 of FIG. 1), a user device 230 (e.g., functionally and/or structurally similar to the user device 130 of FIG. 1) associated with a user U2, student device 240 (e.g., structurally and/or functionally similar to the student device 140 of FIG. 1) associated with students S, a conversation model 260 (e.g., structurally and/or functionally similar to the conversation model 160 of FIG. 1), and database(s) 250 (e.g., structurally and/or functionally similar to the database(s) 150 of FIG. 1).

The evaluation system 200 includes a classifier 206 (e.g., functionally and/or structurally similar to the classifier 106 of FIG. 1), a grading model 208 (e.g., functionally and/or structurally similar to the grading model 108 of FIG. 1), a heuristic grader 210 (e.g., functionally and/or structurally similar to the heuristic grader 110 of FIG. 1), an evidence evaluator 214 (e.g., functionally and/or structurally similar to the evidence evaluator 114 of FIG. 1), a video processor 212 (e.g., functionally and/or structurally similar to the video processor 112 of FIG. 1), and a scoring model 216 (e.g., functionally and/or structurally similar to the scoring model 116 of FIG. 1).

The classifier 206 receives a plurality of inputs from at least one of the databases 250, the conversation model 260 and/or the student devices 240. The inputs from the databases 250 can include user quiz submissions, offline quizzes, offline learning materials, user information, conversation information, and/or the like. In some implementations, the inputs can include an input rubric for classification. The inputs from the conversation model 260 can include student S inputted answers and conversation model 260 answers, conversation model 260 questions and student S answers, conversations with the student S, and/or the like. The inputs from the student devices 240 can include student S usage information. For example, the inputs from the student devices 240 can include signals from a camera, device orientation, and/or the like.

The classifier 206 is configured to classify the plurality of inputs based on at least one rubric. In some implementations, the classifier 206 can update the at least one rubric based on the plurality of inputs. Classifying the plurality of inputs can include classifying the plurality of inputs based on input type based on the rubric. In some implementations, the classifier 206 includes a machine learning model to classify the plurality of inputs. In some implementations, the machine learning model is a large language model, an NLP model, and/or the like. In some implementations, the classifier 206 includes a transformer. In some implementations, the classifier 206 classifies, based on the at least one rubric, the plurality of inputs to a first evaluation type and a second evaluation type. In some implementations, the first evaluation type is associated with the grading model 208 and the second evaluation type is associated with the heuristic grader 210. For example, inputs that are desirable to be processed by the grading model 208 are classified to a first set of inputs associated with a first evaluation type and inputs that are desirable to be processed by the heuristic grader 210 are classified to a second set of inputs associated with a second evaluation type. The classifier 206 can send the respective classified inputs to the grading model 208 and the heuristic grader 210.

The grading model 208 receives, from the classifier 206, a set of inputs that is classified to have an input type associated with the grading model (e.g., first evaluation type). The grading model 208 determines a knowledge state of the associated student S based on the set of inputs. In some implementations, the grading model 208 can be trained to determine the knowledge state. In some implementations, the grading model 208 is a machine learning model. In some implementations, the machine learning model is a large language model, an NLP model, and/or the like. In some implementations, the grading model 208 can determine the knowledge state based on a rubric. The grading model 208 is configured to grade inputs that should be processed to determine the knowledge state. For example, the inputs may be written by a user and the grading model 208 may be configured to extract a pattern associated with the user from the inputs. The pattern may be associated with and/or indicative of how familiar the user is with a certain concept. The grading model 208 may then evaluate the knowledge state based on the pattern and the inputs.

The heuristic grader 210 receives, from the classifier 206, a set of inputs that is classified to have an input type associated with the heuristic grader 210 (e.g., second evaluation type). The heuristic grader 210 is configured to determine a knowledge state of the associated student S based on the set of inputs. In some implementations, the heuristic grader 210 uses at least one rubric to determine the knowledge state. In some implementations, the at least one rubric includes, for example, Bloom's Taxonomy, state or national standards, a taxonomy specific to a school or district, and/or the like. After determining the knowledge state, the grading model 208 and the heuristic grader 210 send their outputs to the evidence evaluator 214.

The evidence evaluator 214 determines if a sufficient amount of evidence (e.g., inputs, etc.) exists to determine a knowledge score based on the knowledge states from the grading model 208 and the heuristic grader 210. In some implementations, the evidence evaluator 214 may determine if there is sufficient evidence based on the at least one rubric. If the evidence evaluator 214 determines there is insufficient evidence, the evidence evaluator 214 then determines what type of evidence can be used to supplement the existing evidence to reach a sufficient amount of information. The evidence evaluator 214 then generates additional user prompts associated with the evidence to supplement the existing evidence. The additional user prompts can include questions, activities, conversations and/or lessons that can be presented to the student S and with which the student S can engage. In some implementations, the evidence evaluator 214 can generate the additional user prompts by accessing predefined and/or prestored user prompts on the subject. In some implementations, the evidence evaluator 214 can use a machine learning model to dynamically generate the additional user prompts. In some implementations, the machine learning model includes a large language model, an NLP model, and/or the like.

The evidence evaluator 214 can send the additional user prompts to the conversation model 260. The conversation model 260 displays, via the student devices 240, the additional user prompts to the associated student S. The conversation model 260, can receive additional inputs from the student S associated with the additional user prompts. The conversation model 260 can send the additional inputs to the classifier 206 for classification. After classification, the classifier 206 sends the classified additional inputs to the grading model 208 and/or the heuristic grader 210. The grading model 208 and/or the heuristic grader 210 generate updated knowledge states based on the classified additional input. The updated knowledge states can be sent to the evidence evaluator 214, which determines if there is now sufficient evidence to generate knowledge grade. If the evidence evaluator 214 determines, again, that there is insufficient evidence, the evidence evaluator 214 again generates additional user prompts which can be sent to the conversation model 260.

The evidence evaluator 214 may, in some implementations, receive information from the video processor 212. The video processor 212 may be configured to receive camera signals from the student device 240, the camera signals including a recording (e.g., live feed, recorded video, etc.) of the associated student S. The video processor 212 can determine, based on the camera signals, student S behavior. For example, the video processor 212 can determine if the student S is, based on body language, engaged, confused, frustrated, and/or the like. The video processor 212 can then send the student S behavior to the evidence evaluator 214. The evidence evaluator 214 can use the student S behavior to determine if there is sufficient evidence. For example, if the student S behavior indicates that a student S appears to be confused about a certain concept, the evidence evaluator 214 may increase the threshold for sufficient evidence.

If the evidence evaluator 214 determines that there is sufficient evidence, the knowledge states are sent to the scoring model 216. The scoring model 216 receives the knowledge states and generates a knowledge score based on the knowledge states. In some implementations, the scoring model 216 generates the knowledge score using the at least one rubric. The scoring model 216 then sends the knowledge score to the user device 230 for review by the user U2.

Figure 3:
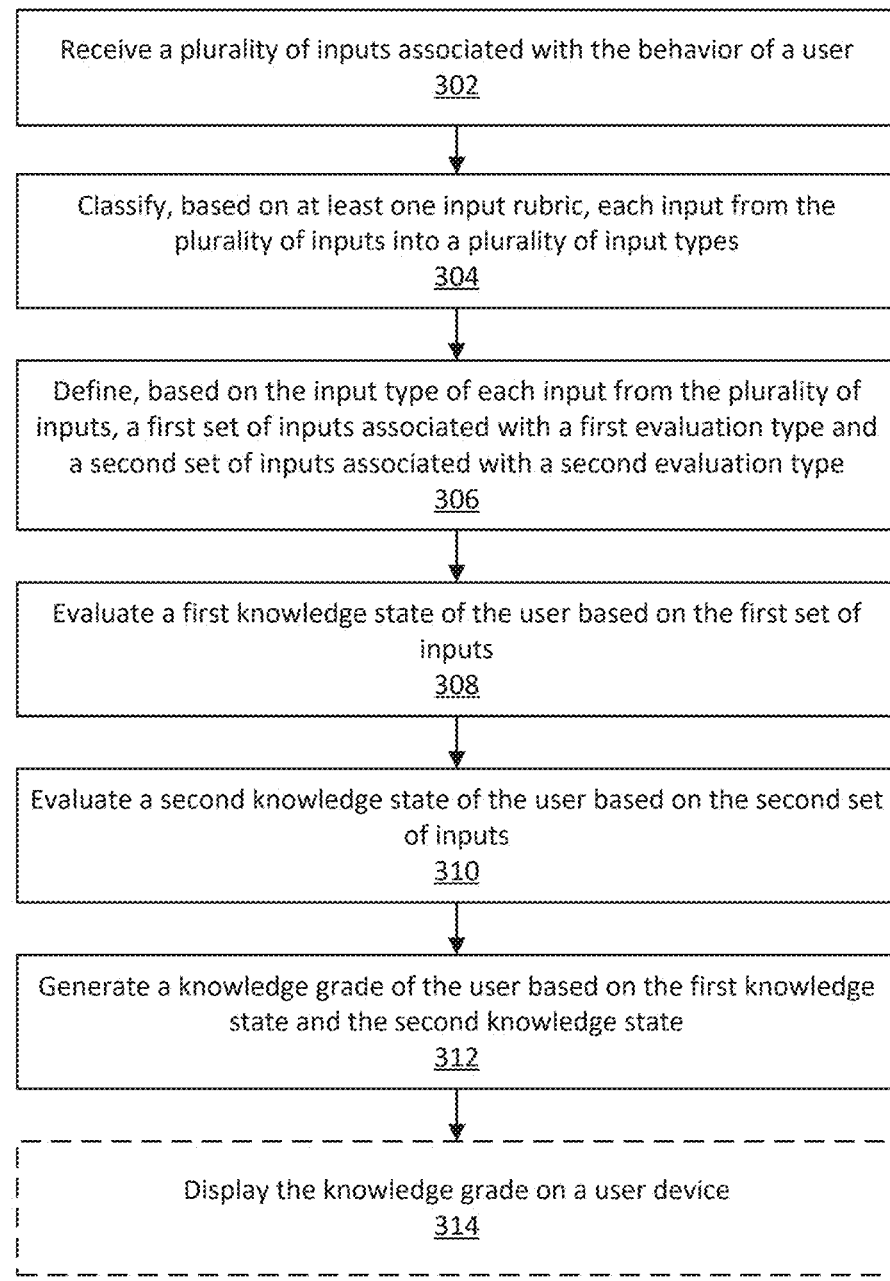
FIG. 3 shows a flowchart for a method of generating an assessment of a user, according to an example embodiment.

FIG. 3 shows a flowchart for a method 300 of generating a knowledge grade of a user, according to an example embodiment. The method 300 includes receiving a plurality of inputs associated with the behavior of a user, at 302; classifying, based on at least one input rubric, each input from the plurality of inputs into a plurality of input types, at 304; defining, based on the input type of each input from the plurality of inputs, a first set of inputs associated with a first evaluation type and a second set of inputs associated with a second evaluation type, at 306; evaluating a first knowledge state of the user based on the first set of inputs, at 308; evaluating a second knowledge state of the user based on the second set of inputs, at 310; generating a knowledge grade of the user based on the first knowledge state and the second knowledge state, at 312; and, optionally, displaying the knowledge grade on a user device, at 314. In some implementations, the method 300 can be executed by a system, such as the system 10 of FIG. 1 and/or the system 20 of FIG. 2.

At 302, the method 300 includes receiving a plurality of inputs associated with the behavior of a user. In some implementations, the user may be a student. The plurality of inputs can include user generated questions, user generated answers to conversation model generated questions, student quiz submissions, offline quiz and learning information, learning interactions, camera data, and/or the like. The behavior of the user can include user knowledge level, user actions during learning, and/or the like.

At 304, the method 300 includes classifying, based on at least one input rubric, each input from the plurality of inputs into a plurality of input types. The at least one input rubric, in some implementations, can include Bloom's Taxonomy, state or national standards, a taxonomy specific to a school or district, and/or the like. The at least one input rubric includes information for how the plurality of inputs should be classified. In some implementations, classifying can be executed by at least one machine learning model. In some implementations, the at least one machine learning model is a large language model. The plurality of inputs can be classified to the plurality of input types based on the at least one rubric. For example, the plurality of input types can include a "remember," "understand," "apply," "analyze," "evaluate," "create," and/or similar category. In some implementations, the plurality of input types can include subtypes. For example, a "remember" input type can include "define," "identify," "describe," "label," "list," "outline," "recall," and/or similar sub-type.

At 306, the method 300 includes defining, based on the input type of each input from the plurality of inputs, a first set of inputs associated with a first evaluation type and a second set of inputs associated with a second evaluation type. In some implementations, the first evaluation type is associated with a machine learning evaluation. In some implementations, the second evaluation type is associated with a heuristic evaluation. Defining the first set of inputs and the second set of inputs allows for inputs to be evaluated differently based on the type of data of each input from the plurality of inputs (e.g., free form and/or natural language data can be analyzed using a machine learning model while more objective data such as multiple choice answers can be evaluated using a heuristic model). In some implementations, 306 can include defining additional sets of inputs associated with at least one additional evaluation type.

At 308, the method 300 includes evaluating a first knowledge state of the user based on the first set of inputs. Evaluating the first knowledge state can include evaluating the first set of inputs using the first evaluation type associated with the first set of inputs. In some implementations, such as when the first evaluation type is associated with a machine learning evaluation, evaluating the first knowledge state includes using a machine learning model (e.g., large language model, natural language processing, etc.). In some implementations, 308 can include extracting, from the first set of inputs, a pattern associated with the user. The first knowledge state may be determined based on the first set of inputs and the pattern. The pattern can indicate information related to a user's familiarity with a concept.

At 310, the method 300 includes evaluating a second knowledge state of the user based on the second set of inputs. Evaluating the second knowledge state can include evaluating the second set of inputs using the second evaluation type associated with the second set of inputs. In some implementations, such as when the second evaluation type is associated with a heuristic grader, evaluating the second knowledge state include using a heuristic grader.

At 312, the method 300 includes generating a knowledge grade of the user based on the first knowledge state and the second knowledge state. The knowledge grade can be generated, in some implementations, based on the at least one rubric. At 314, the method 300 optionally includes displaying the knowledge grade on a user device. This knowledge grade may be sent to a user device and displayed on a display of the user device. In some implementations, the user device may be associated with a second user, different from the user. The user can review the knowledge grade and determine if changes are desired to reach a desired outcome.

Figure 4:
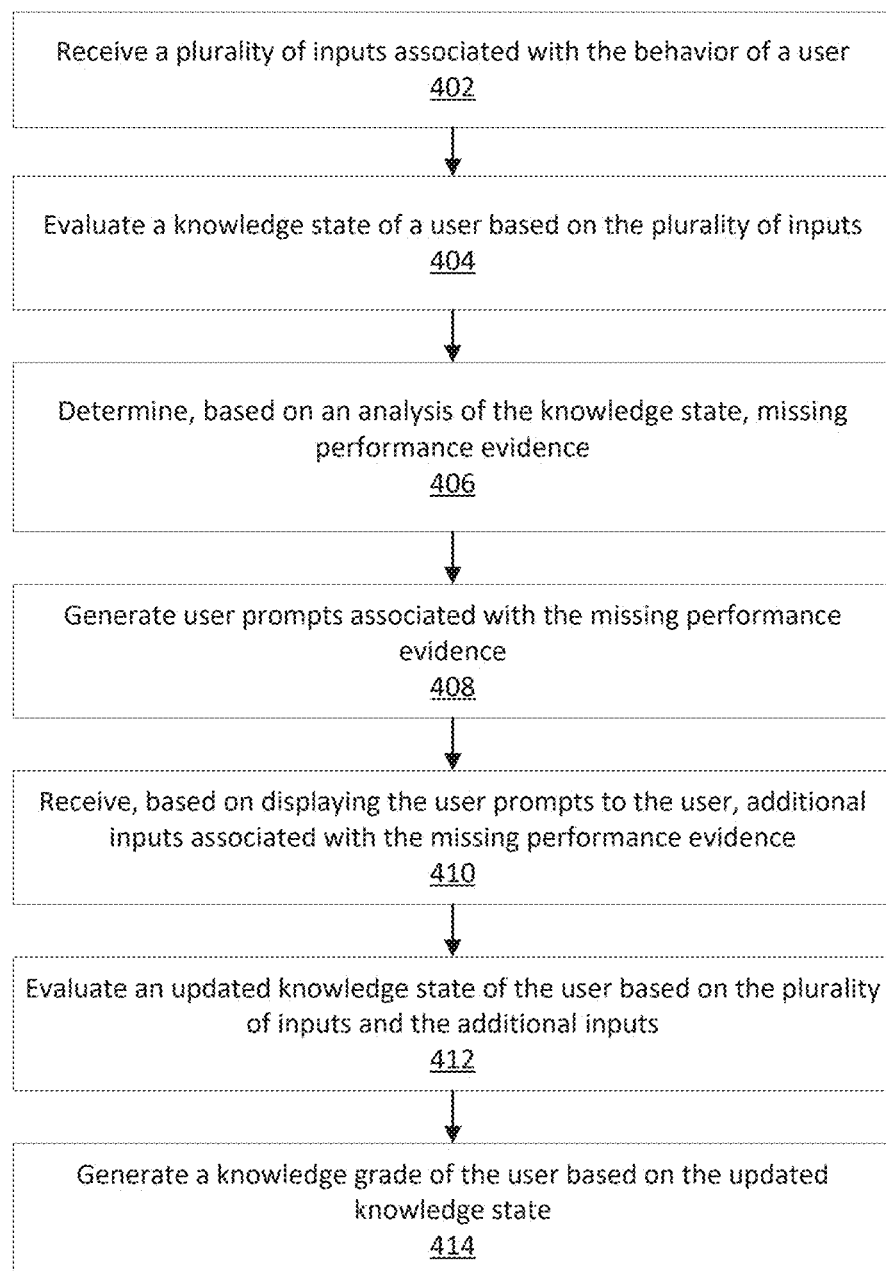
FIG. 4 shows a flowchart for a method of generating an assessment of a user, according to another example embodiment.

FIG. 4 shows a flowchart for a method 400 of generating a knowledge grade of a user, according to another example embodiment. The method 400 includes receiving a plurality of inputs associated with the behavior of a user, at 402; evaluating a knowledge state of a user based on the plurality of inputs, at 404; determining, based on an analysis of the knowledge state, missing performance evidence, at 406; generating user prompts associated with the missing performance evidence, at 408; receiving, based on displaying the user prompts to the user, additional inputs associated with the missing performance evidence, at 410; evaluating an updated knowledge state of the user based on the plurality of inputs and the additional inputs, at 412; and generating a knowledge grade of the user based on the updated knowledge state, at 414. In some implementations, the method 300 can be executed by a system, such as the system 10 of FIG. 1 and/or the system 20 of FIG. 2.

At 402, the method 400 includes receiving a plurality of inputs associated with the behavior of a user. In some implementations, the user may be a student. The plurality of inputs can include user generated questions, user generated answers to conversation model generated question, student quiz submissions, offline quiz and learning information, learning interactions, camera data, and/or the like. The behavior of the user can include user knowledge level, user actions during learning, and/or the like. In some implementations, the plurality of inputs can be preprocessed. For example, 402 can include classifying the plurality of inputs. For example, the plurality of inputs can be classified based on at least one rubric.

At 404, the method 400 includes evaluating a knowledge state of a user based on the plurality of inputs. Evaluating the knowledge state can include evaluating using one or more evaluation type. For example, an evaluation type can include a machine learning evaluation, a heuristic evaluation, and/or the like. In some implementations, the knowledge state can include knowledge states generated by one or more evaluation methods. For example, the knowledge state can include a first knowledge state generated by a machine learning grader and a second knowledge state generated by a heuristic grader.

At 406, the method 400 includes determining, based on an analysis of the knowledge state, missing performance evidence. In some implementations, missing performance evidence can be associated with performance evidence that is not included in the knowledge state based on the one or more rubrics. If, at 406, performance evidence is not determined to be missing, the method 400 may proceed to 414. At 408, the method 400 includes generating user prompts associated with the missing performance evidence. The user prompts can be prompts that may be displayed to a user that instruct the user to input additional inputs to supplement the performance evidence. In some implementations, generating user prompts includes using a machine learning model. In some implementations, the machine learning model is a large language model, NLP model, and/or the like. In some implementations, generating the user prompts includes searching for and choosing prompts from a database of user prompts.

At 410, the method 400 includes receiving, based on displaying the user prompts to the user, additional inputs associated with the missing performance evidence. At 412, the method 400 includes evaluating an updated knowledge state of the user based on the plurality of inputs and the additional inputs. In some implementations, the method 400 can return to 406 to again determine if there is missing performance evidence. The method 400 may repeat this process until performance evidence is determined to not be missing. At 414, the method 400 includes generating a knowledge grade of the user based on the updated knowledge state. The knowledge grade can indicate how the knowledge of a user maps against at least one rubric.

Figure 5:
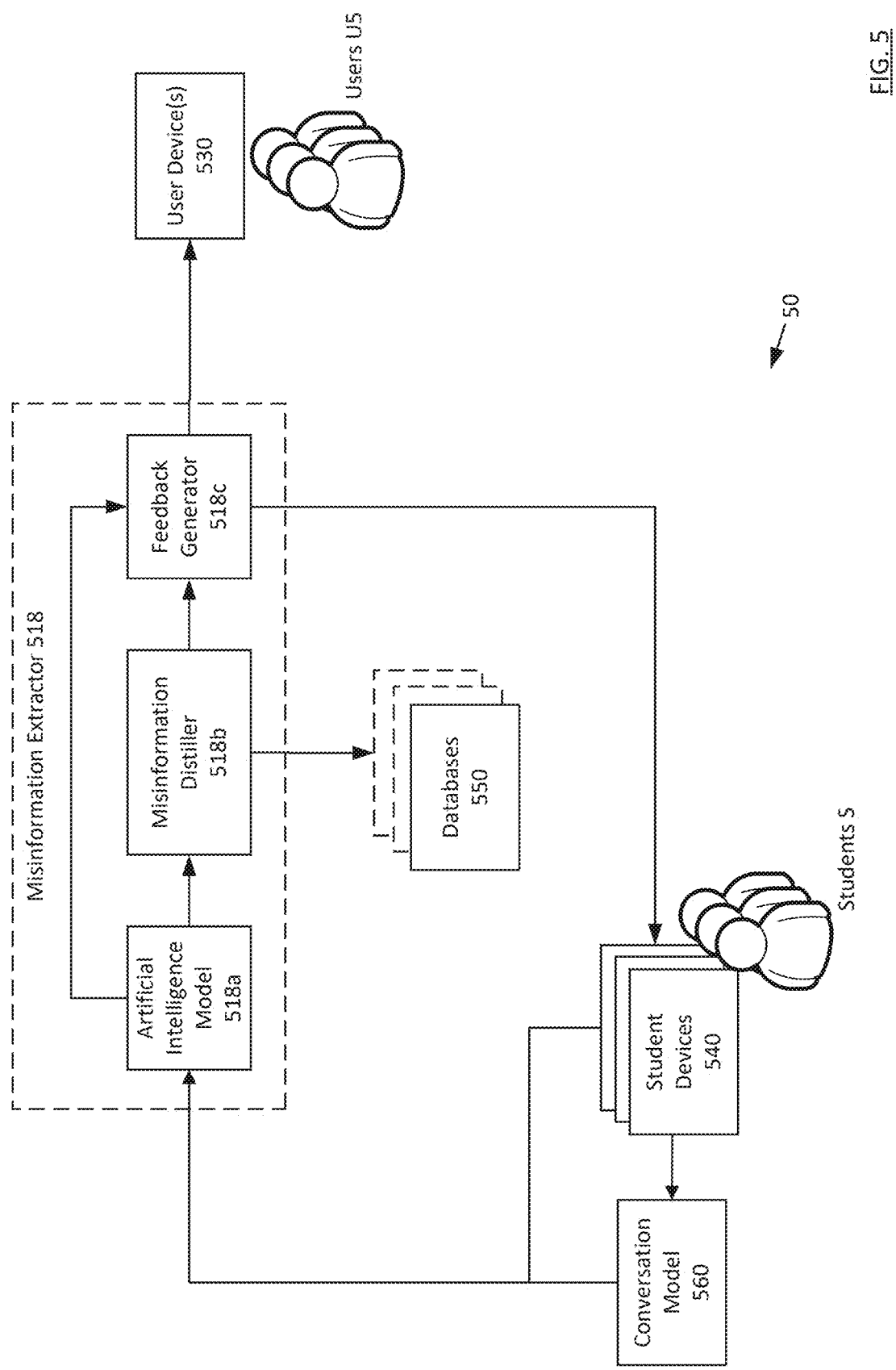
FIG. 5 shows a flow chart for a system for a system for extracting information from user inputs, according to an example embodiment.

FIG. 5 shows a flow chart for a system 50 for a system for extracting information from user inputs, according to an example embodiment. The system 50 includes user device (s) 530 (e.g., structurally and/or functionally similar to the user device 130 of FIG. 1 and/or the user device 230 of FIG. 2) associated with users U5, student devices 540 (e.g., functionally and/or structurally similar to the student devices 140 of FIG. 1 and/or the student devices 240 of FIG. 2) associated with students S, a conversation model 560 (e.g., functionally and/or structurally similar to the conversation model 160 of FIG. 1 and/or the conversation model 260 of FIG. 2), databases 550 (e.g., functionally and/or structurally similar to the databases 150 of FIG. 1 and/or the databases 250 of FIG. 2), and a misinformation extractor 518 (e.g., structurally and/or functionally similar to the misinformation extractor 118 of FIG. 1). The misinformation extractor 518 includes an artificial intelligence model 518a, a misinformation distiller 518b, and a feedback generator 518c.

The artificial intelligence model 518a is configured to receive inputs form the conversation model 560 and/or the student devices 540. In some implementations, the inputs can include questions asked by the students S to the conversation model 560, student S answers to questions displayed by the conversation model 560, student quiz submissions, offline quizzes, learning interactions, and/or the like. In some implementations, the misinformation extractor 518 receives the inputs and preprocesses the inputs. In some implementations, preprocessing can include clustering and/or merging of inputs to reduce redundancy and group together the inputs.

The artificial intelligence model 518a is an artificial intelligence model configured to extract misinformation from the inputs. Misinformation can include student S misunderstandings, gaps in student knowledge, incomplete information, incorrect information, inaccurate conceptions of concepts, misidentifying concepts, and/or the like. For example, misinformation can be mistaking similarities in nomenclature, such as, for example, mistaking stem and leaf in biology and stem and leaf in statistical plots. As another example, misinformation can include mistaking surface similarities in perception, such as, for example, mistaking the sun's heat and brightness for burning instead of nuclear fusion. As another example, misinformation can include pigeonholed concepts, such as, for example, thinking that electrons orbit the atomic nucleus the same way planets orbit the Sun. As another example, misinformation including gaps in knowledge can include identifying a missing prerequisite for understanding a concept. In some implementations, the artificial intelligence model 518a is a large language model. After extracting the misinformation from the inputs, the artificial intelligence model 518a sends the extracted misinformation to the misinformation distiller and the feedback generator 518c.

The misinformation distiller 518b receives the extracted misinformation and distills the misinformation. Distilling can include categorizing the misinformation into predetermined or dynamically generated categories. In some implementations, the misinformation distiller 518b can include a machine learning model. In some implementations, the machine learning model is a language model. The misinformation distiller 518b sends the distilled information to the feedback generator 518c and at least one of the databases 550. The databases 550 can include a repository of misinformation that may be accessed to determine trends in misinformation or similar information.

The feedback generator 518c receives extracted misinformation from the artificial intelligence model 518a and the misinformation distiller 518b. The feedback generator 518c generates feedback for the students S based on the extracted misinformation from the artificial intelligence model 518a. The feedback generator 518c sends the feedback to the student devices 540 to display the feedback to the students S. The feedback can include a report of the misinformation, information correcting the misinformation, sources with accurate information, indication identifying the misinformation, and/or the like.

The feedback generator 518c generates feedback for the users U5 (e.g., teachers, parents, etc.) based on the extracted misinformation and/or information stored in the databases 550. The feedback can include reports on the presently extracted misinformation and/or broader information regarding patterns in misinformation associated with the students S. For example, if a majority of students S are misunderstanding the same concept or gaps in understanding, the report can indicate the misunderstanding and/or the gaps and a teacher can adjust a lesson plan accordingly. The reports can be sent to the user device(s) 530 to be displayed to the users U5.

While shown and described herein as being used to determine a student's knowledge grade and/or extract misinformation in an educational setting and/or context, in other implementations, the systems and methods described herein can be used for any other suitable purpose. For example, the predictive systems and methods described herein can be used to grade an individual in a particular role and/or job, grade the performance of a company, grade the performance of a system for a particular task, and/or the like. The systems and methods described herein can also be used to extract misinformation in other settings or contexts such as on the internet, etc.

In some embodiments, a non-transitory processor-readable medium stores code representing instructions to be executed by one or more processors. The instructions include code to cause the one or more processors to receive, a plurality of inputs associated with a behavior of a user. The instructions include code to cause the one or more processors to classify, based on a first machine learning model using at least one input rubric, each input from the plurality of inputs into an input type from a plurality of input types. The first machine learning model is configured to extract relevant classification data from the plurality of inputs. The instructions include code to cause the one or more processors to define, based on the input type of each input from the plurality of inputs, a first set of inputs associated with a first evaluation type and a second set of inputs associated with a second evaluation type, wherein the second evaluation type is associated with a lower computational cost than the first evaluation type. The instructions include code to cause the one or more processors to select a second machine learning model based on the first evaluation type, the second machine learning model trained based on analytical data associated with the user. The instructions include code to cause the one or more processors to extract, using the second machine learning model, from the first set of inputs a pattern associated with the user. The instructions include code to cause the one or more processors to evaluate a first state of the user based on the pattern and a second state of the user based on the second set of inputs. The instructions include code to cause the one or more processors to generate a grade of the user based on the first state and the second state.

In some implementations, the non-transitory processor-readable medium further includes code to cause the one or more processors to send, to a user device, the grade.

In some implementations, the non-transitory processor-readable medium further includes code to cause the one or more processors to determine, based on the first state and the second state, missing performance data based on a third machine learning model using a rubric mapped to the first state and the second state, generate user prompts associated with the missing performance data, send the user prompts to the user, receive, from the user, additional inputs associated with the missing performance data, and evaluate an updated state of the user based on the plurality of inputs and the additional inputs.

In some implementations, the first evaluation type is a machine learning evaluation and the second evaluation type is a heuristic evaluation.

In some implementations, the second machine learning model includes a large language model (LLM).

In some implementations, the plurality of inputs includes at least one of user questions, user answers, generated questions, or generated answers.

In some implementations, the non-transitory processor-readable medium further includes code to cause the one or more processors to provide the plurality of inputs as an input to a third machine learning model trained with representations of common misinformation, identify, misinformation associated with the user, based on the output of the third machine learning model, and provide feedback associated with the misinformation to the user.

In some embodiments, a method includes receiving, a plurality of inputs associated with a behavior of a user. The method includes classifying, based on a first machine learning model, each input from the plurality of inputs into an input type from a plurality of input types. The method includes defining, based on the input type of each input from the plurality of inputs, a first set of inputs associated with a first evaluation type and a second set of inputs associated with a second evaluation type. The method includes selecting a second machine learning model based on the first evaluation type. The method includes extracting, using the second machine learning model, from the first set of inputs a pattern associated with the user. The method includes evaluating a first state of the user based on the pattern and a second state of the user based on the second set of inputs. The method includes determining, based on the first state and the second state, if the first state and the second state satisfy one or more rubric condition. The method includes responsive to determining that the one or more rubric condition is not satisfied, generating, using a third machine learning model, one or more outputs. The method includes receiving, at least one update input associated with the one or more outputs. The method includes updating at least one of the first state or the second state based on the at least one update input. The method includes responsive to determining that the one or more rubric condition is satisfied, generating a grade of the user based on the first state and the second state.

In some implementations, the first evaluation type is a machine learning evaluation and the second evaluation type is a heuristic evaluation.

In some implementations, the second evaluation type is associated with a lower computational cost than the first evaluation type.

In some implementations, the third machine learning model includes at least one of a large language model or a reinforcement learning model.

In some implementations, the one or more rubric condition includes a total amount of data associated with a subject exceeding a predetermined threshold.

In some implementations, the one or more output is associated with the subject.

In some implementations, the method further includes receiving a visual signal associated with the user, the visual signal associated with a user engagement, determining, based on a vision transformer model, a visual user behavior, and updating, based on the visual user behavior, at least one of the first state or the second state.

In some implementations, the method further includes determining, using the third machine learning model based on the visual user behavior, a user response behavior associated with the plurality of inputs and determining, based on the user response behavior, if the user response behavior satisfied the one or more rubric condition.

In some embodiments, a method includes training, a first machine learning model, based on a set of representations of misinformation. The method includes receiving a plurality of inputs associated with behavior of a user. The method includes filtering the plurality of inputs to remove duplicate inputs. The method includes clustering, using the first machine learning model, the plurality of inputs based on input type to define clustered inputs. The method includes extracting, from the clustered inputs using the first machine learning model, one or more identified misinformation. The method includes categorizing the one or more identified misinformation to one or more categories to define categorized misinformation. The method includes training the first machine learning model based on the categorized misinformation to update the set of representations of misinformation with current information. The method includes generating, using a second machine learning model based on the one or more categories, at least one output. The method includes sending, to a user device, the at least one output.

In some implementations, the first machine learning model is a large language model.

In some implementations, the at least one output includes at least one of a report, information, sources, or an indication of identified misinformation.

In some implementations, the method further includes generating a feedback report based on the categorized misinformation and information associated with the categorized misinformation.

In some implementations, the method further includes customizing the feedback report based on the user associated with the user device.

It should be understood that the disclosed embodiments are not intended to be exhaustive, and functional, logical, operational, organizational, structural and/or topological modifications may be made without departing from the scope of the disclosure. As such, all examples and/or embodiments are deemed to be non-limiting throughout this disclosure.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A non-transitory processor-readable medium storing code representing instructions to be executed by one or more processors, the instructions comprising code to cause the one or more processors to:
    receive, a plurality of inputs associated with a behavior of a user;
    classify, based on a first machine learning model and using at least one input rubric, each input from the plurality of inputs into an input type from a plurality of input types, the first machine learning model configured to extract relevant classification data from the plurality of inputs;
define, based on the input type of each input from the plurality of inputs, a first set of inputs associated with a first evaluation type and a second set of inputs associated with a second evaluation type, wherein the second evaluation type is associated with a lower computational cost than the first evaluation type;
select, based on the first evaluation type, a second machine learning model, the second machine learning model trained based on analytical data associated with the user;
extract, using the second machine learning model, from the first set of inputs a pattern associated with the user;
evaluate a first state of the user based on the pattern and a second state of the user based on the second set of inputs; and
generate a grade of the user based on the first state and the second state.

2. The non-transitory processor-readable medium of claim 1, further comprising code to cause the one or more processors to:
send, to a user device, the grade.

3. The non-transitory processor-readable medium of claim 1, further comprising code to cause the one or more processors to:
determine, based on the first state and the second state, missing performance data based on a third machine learning model, the third machine learning model using a rubric mapped to the first state and the second state;
generate user prompts associated with the missing performance data;
send the user prompts to the user;
receive, from the user, additional inputs associated with the missing performance data; and
evaluate an updated state of the user based on the plurality of inputs and the additional inputs.

4. The non-transitory processor-readable medium of claim 1, wherein the first evaluation type is a machine learning evaluation and the second evaluation type is a heuristic evaluation.

5. The non-transitory processor-readable medium of claim 1, wherein the second machine learning model includes a large language model (LLM).

6. The non-transitory processor-readable medium of claim 1, wherein the plurality of inputs includes at least one of user questions, user answers, generated questions, or generated answers.

7. The non-transitory processor-readable medium of claim 1, further comprising code to cause the one or more processors to:
provide the plurality of inputs as an input to a third machine learning model trained with representations of common misinformation;
identify, based on an output of the third machine learning model, user misinformation associated with the user; and
provide feedback associated with the user misinformation to the user.

8. A method, comprising:
receiving, a plurality of inputs associated with a behavior of a user;
classifying, based on a first machine learning model, each input from the plurality of inputs into an input type from a plurality of input types;
defining, based on the input type of each input from the plurality of inputs, a first set of inputs associated with a first evaluation type and a second set of inputs associated with a second evaluation type;
selecting, based on the first evaluation type, a second machine learning model;
extracting, using the second machine learning model, from the first set of inputs a pattern associated with the user;
evaluating a first state of the user based on the pattern and a second state of the user based on the second set of inputs;
determining, based on the first state and the second state, if the first state and the second state satisfy one or more rubric condition;
responsive to determining that the one or more rubric condition is not satisfied, generating, using a third machine learning model, one or more outputs;
receiving, at least one update input associated with the one or more outputs;
updating at least one of the first state or the second state based on the at least one update input; and
responsive to determining that the one or more rubric condition is satisfied, generating a grade of the user based on the first state and the second state.

9. The method of claim 8, wherein the first evaluation type is a machine learning evaluation and the second evaluation type is a heuristic evaluation.

10. The method of claim 8, wherein the second evaluation type is associated with a lower computational cost than the first evaluation type.

11. The method of claim 8, wherein the third machine learning model includes at least one of a large language model or a reinforcement learning model.

12. The method of claim 8, wherein the one or more rubric condition includes a total amount of data associated with a subject exceeding a predetermined threshold.

13. The method of claim 12, wherein the one or more outputs is associated with the subject.

14. The method of claim 8, further comprising:
receiving a visual signal associated with the user, the visual signal associated with a user engagement;
determining, based on a vision transformer model, a visual user behavior; and
updating, based on the visual user behavior, at least one of the first state or the second state.

15. The method of claim 14, further comprising:
determining, using the third machine learning model and based on the visual user behavior, a user response behavior associated with the plurality of inputs; and
determining, based on the user response behavior, if the user response behavior satisfied the one or more rubric condition.

16. A method, comprising:
training, a first machine learning model, based on a set of representations of misinformation;
receiving a plurality of inputs associated with behavior of a user;
filtering the plurality of inputs to remove duplicate inputs;
clustering, using the first machine learning model, the plurality of inputs based on input type to define clustered inputs;
extracting, from the clustered inputs using the first machine learning model, one or more identified misinformation;

categorizing the one or more identified misinformation to one or more categories to define categorized misinformation;

training the first machine learning model based on the categorized misinformation to update the set of representations of misinformation with current information;

generating, using a second machine learning model and based on the one or more categories, at least one output; and sending, to a user device, the at least one output.

17. The method of claim 16, wherein the first machine learning model is a large language model.

18. The method of claim 16, wherein the at least one output includes at least one of a report, information, sources, or an indication of identified misinformation.

19. The method of claim 16, further comprising:

generating a feedback report based on the categorized misinformation and information associated with the categorized misinformation.

20. The method of claim 19, further comprising:
customizing the feedback report based on the user.

* * * * *